UNITED STATES PATENT OFFICE.

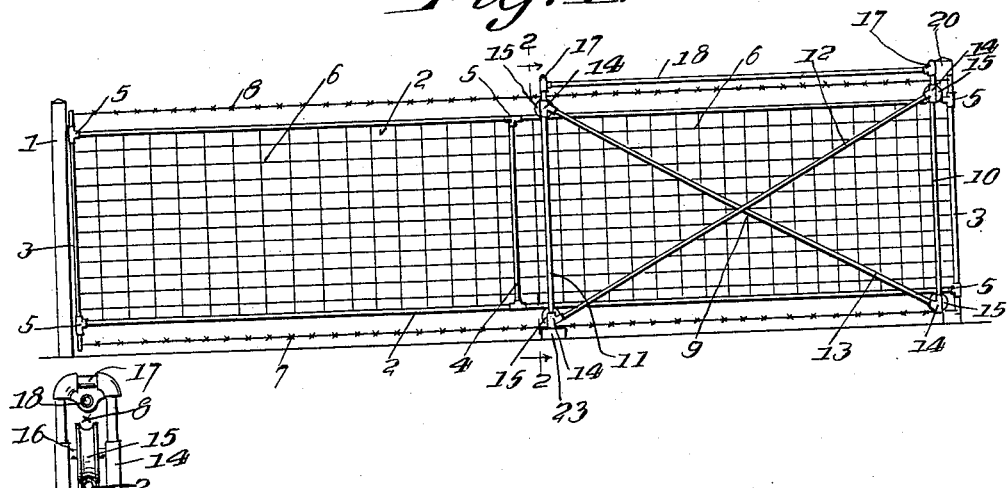

WILLIAM H. GEE AND CHARLES E. GEE, OF MASKELL, NEBRASKA.

GATE.

1,077,269.  Specification of Letters Patent.  Patented Nov. 4, 1913.

Application filed April 3, 1913. Serial No. 758,607.

*To all whom it may concern:*

Be it known that we, WILLIAM H. GEE and CHARLES E. GEE, citizens of the United States of America, and residents of Maskell, in the county of Dixon and State of Nebraska, have invented certain new and useful Improvements in Gates, of which the following is a specification.

This invention relates to certain new and useful improvements in gates and it has for its objects among others to provide a simplified and improved form of gate which will serve as a handy barnyard gate, for use at milk yards, feed yards, and other places where a gate is in use more or less all the year around.

It has for a further object to provide a gate which will not have to be elevated but which can be easily slid back and forth. The gate is so constructed that if it be desired to lead a horse or other animal therethrough, one can slide the gate back and after passing through, the gate is pulled shut, no swinging or lifting being necessary. Again, if it be desired to go through with a team, the gate can be slid back far enough for that purpose and then slid to its closed position. If it be desired to go through with a four-horse team, the gate may be slid back and then turned bodily upon its pivot. The construction is such that when the gate is slid back in position to be swung around, it is on a balance so that it will not pull the post over and it can be swung with ease.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of the gate in its closed position. Fig. 2 is a vertical cross section on the line 2—2 of Fig. 1, looking in the direction of the arrows. Fig. 3 is an enlarged detail in top plan, at the hinge post. Fig. 4 is a diagram in plan showing by dotted lines the different positions of the gate.

Like numerals of reference indicate like parts throughout the different views.

Referring to the drawings, 1 designates the post against which the gate closes. Any suitable form of latch or fastening may be provided if desired. The gate proper may be of any suitable dimensions and constructed in any well-known or preferred way. In the present instance, we have shown it as comprising a framework 2 composed of upper and lower rods or members joined to the end members 3, 3, and the intermediate vertical member or rod 4. These vertical and horizontal rods or members may be connected at their points of juncture in any suitable manner, as by couplings or the like 5, as seen in Fig. 1. Wire of any suitable mesh, as seen at 6, preferably electric weld wire, is secured to these horizontal and vertical members so as to provide a strong yet light and easily movable gate.

A barbed wire 7 may be arranged at the bottom of the gate, connecting the lower ends of the members 3, 3, as seen in Fig. 1, to prevent pigs and smaller animals from getting under the gate. A similar barbed wire 8 may be arranged at the top of the gate, connecting the upper ends of the end members 3, 3, as shown in Fig. 1, to prevent the stock from rubbing on the gate.

9 is a swinging frame composed of parallel end members 10 and 11 and the crossed diagonally disposed longitudinal members 12 and 13, the crossed members being united at their ends to the vertical end members in any suitable way, as by couplings or the like 14, as seen in Fig. 1.

15 are grooved rollers mounted on suitable shafts or axles 16 at the upper and lower ends of the end members 10 and 11 of the swinging frame, as seen clearly in Figs. 1, 2 and 3, with which the upper and lower longitudinal members 2, 2 of the gate engage as the gate slides back and forth, as will be understood upon reference to Figs. 1 and 2.

The upper ends of the end members 10 and 11 of the swinging frame are joined by the arched members 17, as seen in Figs. 1 and 2, and these end arched members are connected by the brace rod 18 which serves to give great rigidity to the swinging frame without materially increasing its weight.

The swinging frame is mounted upon the hinges or vertical pintles 19 which are secured in arms 20 projecting from the angular brackets 21 which are secured to the hinge post 22, as seen best in the plan view, Fig. 3.

With the parts constructed and arranged substantially as described, the operation will be apparent. As seen in Fig. 1, the gate is in its closed position. If it be desired to open it so that a person or animal may pass through, it is simply pushed to the right a sufficient distance, moving easily upon its rollers and then slid back to its closed position. It can be moved through the swinging frame until its latch-end is practically in alinement with the adjacent end members 11 of the swinging frame, so that a horse and wagon may pass through. Then if it be desired to have a greater opening, the gate thus balanced within the swinging frame may be turned around into the position indicated by dotted lines in Fig. 4, at right angles to the position in which it is seen in Fig. 1, so as to disclose all of the opening between the latch post 1 and the hinge post 22, as will be evident upon an inspection of Fig. 4. When it is desired to close the gate, it is swung around upon its hinges into the position indicated by partial full and partial dotted lines at the right of Fig. 4 and then moved to its closed position by sliding the same through the swinging frame. The end members 11 of the swinging frame may be supported upon a suitable base or block 23 when in its normal position, as seen in Fig. 2.

What is claimed as new is:—

1. A swinging frame, rollers mounted therein at the top and bottom thereof, and a gate slidable through said frame with its top and bottom bars engaging and coöperating with said rollers, said frame comprising spaced vertical and longitudinal members, the latter being crossed, and a brace rod connecting the upper ends of the end members of the frame above the upper roller.

2. A swinging frame comprising spaced end members and spaced side members extending angularly from the end members and crossed, arched members joining the upper ends of the end members, a brace rod connecting said arched members, rollers in said frame at the top and bottom thereof, and a gate slidable in said swinging frame independent thereof with its top and bottom bars engaging said rollers and disposed between the same, said gate being adapted to swing in said frame.

Signed by us at Maskell, Nebraska, this 31st day of March 1913.

WILLIAM H. GEE.
CHARLES E. GEE.

Witnesses:
EDWIN C. JOHNSON,
RAY F. SNYDER.